(12) United States Patent
Thaler et al.

(10) Patent No.: US 10,989,569 B2
(45) Date of Patent: Apr. 27, 2021

(54) BEARINGLESS ANGULAR MEASUREMENT DEVICE

(71) Applicant: DR. JOHANNES HEIDENHAIN GmbH, Traunreut (DE)

(72) Inventors: Josef Thaler, Traunreut (DE); Erich Strasser, Trostberg (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 109 days.

(21) Appl. No.: 16/269,208

(22) Filed: Feb. 6, 2019

(65) Prior Publication Data
US 2019/0250012 A1 Aug. 15, 2019

(30) Foreign Application Priority Data
Feb. 14, 2018 (DE) .................... 10 2018 202 239.9

(51) Int. Cl.
| | |
|---|---|
| *G01D 5/347* | (2006.01) |
| *G01D 5/244* | (2006.01) |
| *G01D 11/24* | (2006.01) |
| *G01B 21/22* | (2006.01) |
| *F16C 32/04* | (2006.01) |

(52) U.S. Cl.
CPC .......... *G01D 5/3473* (2013.01); *G01B 21/22* (2013.01); *G01D 5/24433* (2013.01); *G01D 5/24442* (2013.01); *G01D 11/245* (2013.01); *F16C 32/0444* (2013.01)

(58) Field of Classification Search
CPC ............ G01D 5/3473; G01D 5/24433; G01D 5/24442; G01D 11/30; G01D 11/245; G01D 5/24423; G01B 21/22; G01B 5/24; G01P 1/02; F16C 32/0444
See application file for complete search history.

(56) References Cited

U.S. PATENT DOCUMENTS

| | | | |
|---|---|---|---|
| 6,806,461 B2 | 10/2004 | Strasser | |
| 7,470,890 B2 * | 12/2008 | Schroter | ............ G01D 5/24442 250/231.13 |

(Continued)

FOREIGN PATENT DOCUMENTS

| | | |
|---|---|---|
| EP | 1126248 A2 | 8/2001 |
| EP | 1154241 A1 | 11/2001 |
| EP | 1750101 A1 | 2/2007 |

OTHER PUBLICATIONS

European Search Report issued to European Patent Application No. 18206233.1, dated Jul. 3, 2019, 2 pages.

*Primary Examiner* — Jennifer D Bennett
(74) *Attorney, Agent, or Firm* — Carter Deluca & Farrell LLP

(57) ABSTRACT

A bearingless angular measurement device includes an angle scale, a scanning unit, and an evaluation electronics. The scanning unit and the angle scale are located at a scanning distance relative to each other and are rotatable about an axis, so that the scanning unit is capable of generating angle-dependent output signals, which may be further processed in the evaluation electronics. The scanning distance is able to be determined on the basis of the output signals. In addition, the angular measurement device includes a compensation coupling that is attachable to a machine component and is elastically deformable in the direction of the axis.

18 Claims, 2 Drawing Sheets

(56) References Cited

U.S. PATENT DOCUMENTS

| | | | |
|---|---|---|---|
| 2002/0002777 A1* | 1/2002 | Torr | G01D 5/34738 |
| | | | 33/1 PT |
| 2002/0074701 A1 | 6/2002 | Detzner | |
| 2008/0054795 A1 | 3/2008 | Siraky et al. | |
| 2009/0095892 A1* | 4/2009 | Summers | G01D 5/3473 |
| | | | 250/231.1 |
| 2014/0113271 A1* | 4/2014 | Elder | G09B 25/02 |
| | | | 434/401 |

* cited by examiner

BEARINGLESS ANGULAR MEASUREMENT DEVICE

CROSS-REFERENCE TO RELATED APPLICATIONS

The present application claims priority to Application No. 10 2018 202 239.9, filed in the Federal Republic of Germany on Feb. 14, 2018, which is expressly incorporated herein in its entirety by reference thereto.

FIELD OF THE INVENTION

The present invention relates to a bearingless angular measurement device.

BACKGROUND INFORMATION

Angle-measuring devices may be based on an inductive, a magnetic, or a capacitive measuring principle and, for example, are used in rotary encoders for the purpose of determining the angular position of two machine parts that are rotatable relative to each other.

In the case of inductive angle-measuring devices, excitation coils and receiver coils in the form of circuit traces are frequently applied on a shared circuit board as a scanning unit, the circuit board being fixedly connected to a stator of a rotary encoder, for example. Situated across from this circuit board is a further circuit board on which, as an angle scale, electrically conductive surfaces are applied at periodic intervals as a graduation structure, the further circuit board being connected to the rotor of the rotary encoder in a torsionally fixed manner. When an electric excitation field is applied at the excitation coils, output signals are generated in the receiver coils as a function of the angular position during the relative rotation between the rotor and stator. These output signals are then further processed in evaluation electronics.

In principle, it is distinguished between angular measurement devices having integral bearings and angular measurement devices without integral bearings, hereinafter referred to as bearingless angular measurement devices. Angular measurement devices having integral bearings usually have relatively small rolling bearings, so that the component groups that are rotatable relative to one another within the particular angle-measuring device are situated in a defined axial and radial position relative to one another. In the case of bearingless angular measurement devices, on the other hand, attention must be paid during the installation on a machine that the component groups that are rotatable relative to one another are installed in the right position and, in particular, are fixed in place at the correct axial distance from one another.

European Published Patent Application Nos. 1 750 101 and 1 126 248 describe angular measurement devices that are suitable for determining a scanning distance.

SUMMARY

Example embodiment of the present invention provide a bearingless, e.g., an inductive, angular measurement device so that a precise determination of the scanning distance is possible and an optimized mechanical connection is obtained.

According to an example embodiment of the present invention, a bearingless angular measurement device includes an angle scale, a scanning unit, and an evaluation electronics. The scanning unit and the angle scale are disposed at a scanning distance relative to each other such that a rotation about an axis is possible. In addition, the scanning unit is adapted to generate angle-dependent output signals, which may be further processed in the evaluation electronics. The angular measurement device is configured such that the scanning distance is able to be determined on the basis of the output signals. Furthermore, the angular measurement device includes a compensation coupling, which is able to be fixed in place on a machine component and is elastically deformable in the direction of the axis.

The compensation coupling is arranged so that it pushes the angular measurement device, in particular the component group of the angular measurement device in which the scanning unit is fixed in place in a torsionally fixed manner, against the machine component on a permanent basis.

Angle-dependent output signals, for example, include signals that include information about the relative angular position between the angle scale and the scanning unit.

The compensation coupling may be elastically deformable in the direction of the axis across a travel of at least 0.5 mm, e.g., at least 1.0 mm, at least 1.5 mm, etc.

The compensation coupling may include a plurality of angled components. In this context, each of the components may have a first lateral side, which extends in a direction with a radial directional component, and a second lateral side, which extends in a direction with an axial directional component.

The scanning unit may be connected to a housing in a torsionally fixed manner, and the compensation coupling may also be fixed in place on the housing in a torsionally fixed manner.

The compensation coupling may be torsionally stiff, e.g., such that it does not deform, or deforms only to an extremely limited extent, in response to introduced tangentially directed forces. In addition, the compensation coupling may have a rigid configuration with regard to a radial direction.

The angular measurement device may be arranged as an inductive angular measurement device.

The scanning unit may be adapted to scan the angle scale across at least one half of its circumference, thereby making it possible to generate angle-dependent output signals. The scanning unit may be able to scan the angle scale across at least 66%, e.g., across 75% of the circumference. In particular, the angular measurement device may be configured so that the inclination of the axis relative to the scanning unit is able to be determined on the basis of the output signals.

An inductive angular measurement device may be configured such that the angle scale is scannable by the scanning unit or by the sensor coils across a large portion of its circumference, thereby making it possible to generate angle-dependent output signals. Alternatively, the angular measurement device may be configured such that the angle scale is scanned via a plurality of scanning points distributed across the circumference, so that the inclination of axis X is able to be determined in such a manner.

The evaluation electronics may include a unit adapted to determine the signal amplitudes of the output signals, and the scanning distance is able to be determined on the basis of the signal amplitudes of the output signals.

The unit adapted to determine the signal amplitudes may be allocated to a control unit, which is configured such that by acting on a control variable, the signal amplitudes of the output signals do not exceed a predefined deviation from a setpoint amplitude value.

The angular measurement device may include an electronics system by which the scanning distance is able to be determined. In particular, the evaluation electronics may be adapted to determine the scanning distance. Via a digital interface, for example, the scanning distance may be transmitted to an external (relative to the angular measurement device) subsequent electronics for the further electronic processing. Alternatively, the determined scanning distance may be further processed electronically within the angular measurement device. The determined or calculated scanning distance is thus used for the further electronic processing inside or outside the angular measurement device.

The evaluation electronics may be adapted to generate a digital value for the scanning distance, e.g., a binary number, which may be further processed in a microprocessor. If this microprocessor is situated outside the angular measurement device, then the angular measurement device may include an interface by which the value is transmittable to a subsequent electronics.

Further features and aspects of example embodiments of the present invention are described in greater detail below with reference to the appended Figures.

DETAILED DESCRIPTION

Figure 1:
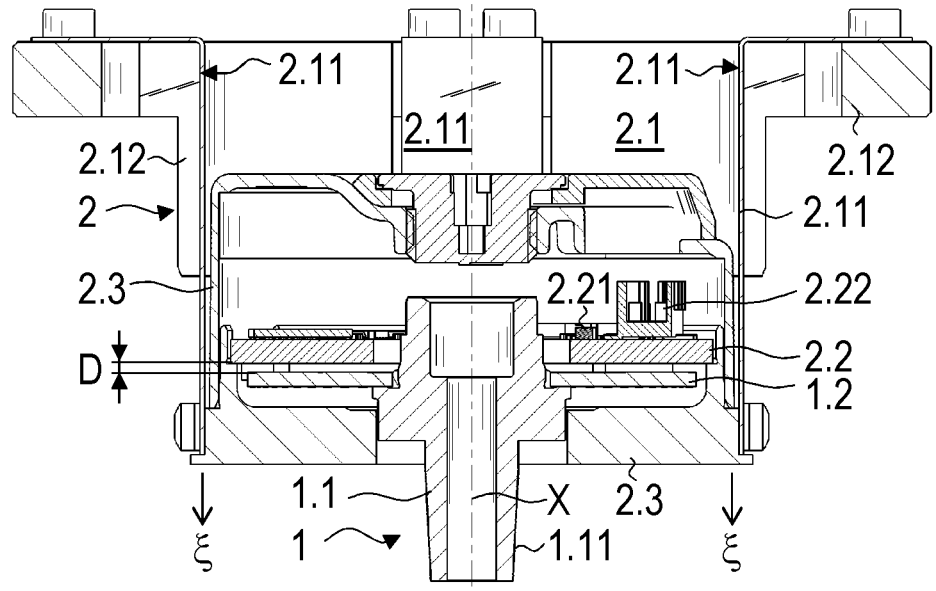
FIG. 1 is a cross-sectional view of an angular measurement device.
Figure 2:
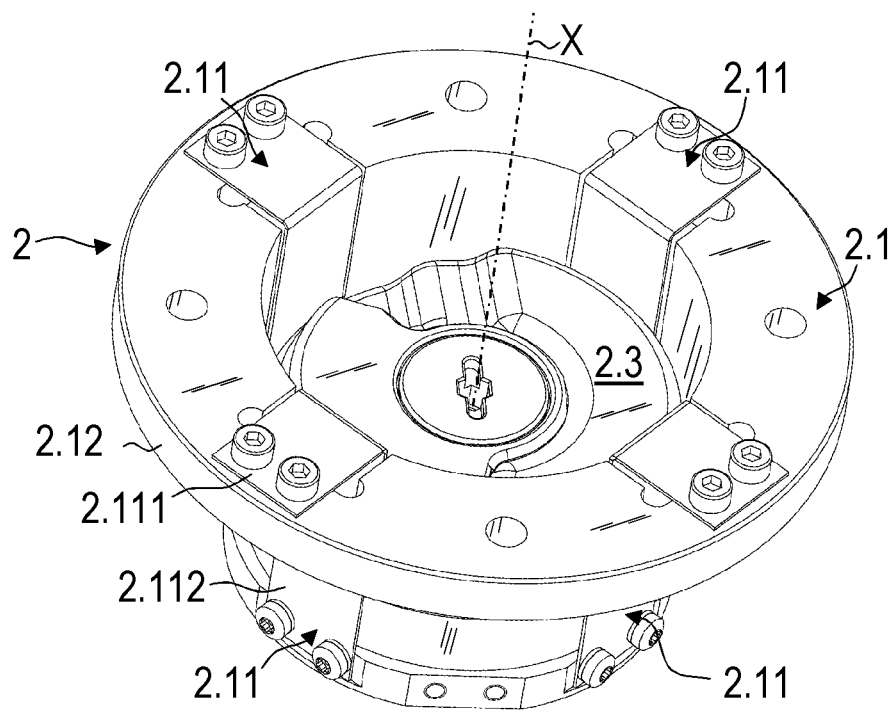
FIG. 2 is a first perspective view of the angular measurement device.
Figure 3:
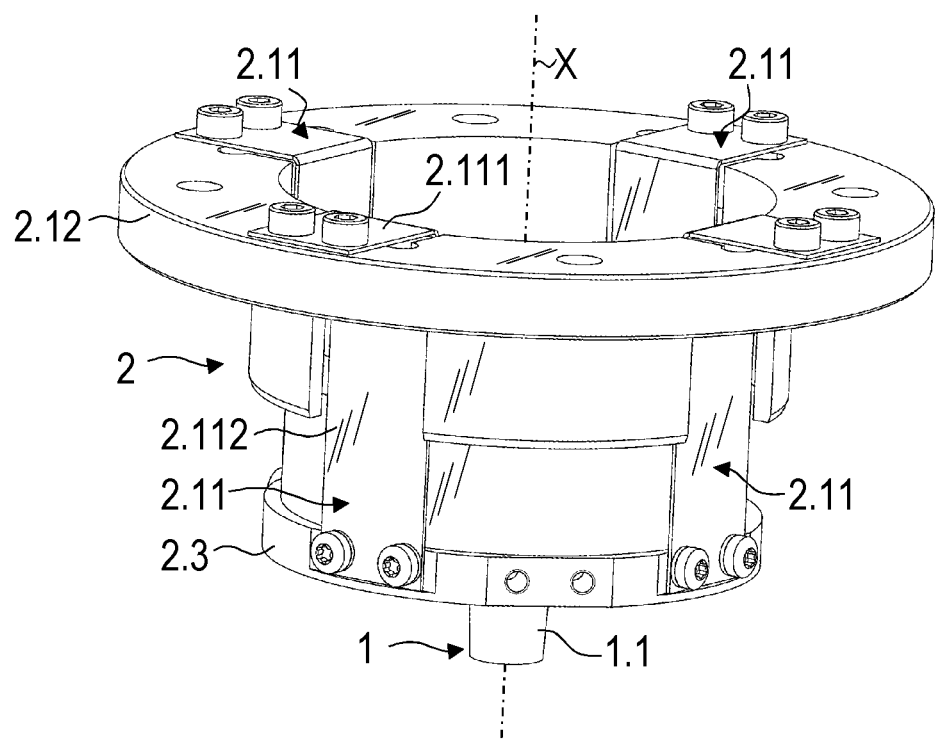
FIG. 3 is a second perspective view of the angular measurement device.

An angular measurement device according to an exemplary embodiment of the present invention, which is arranged as an inductive angular measurement device, for example, is illustrated in FIGS. 1 to 3. The angular measurement device includes a first component group 1 and a second component group 2, the two component groups 1, 2 being arranged so as to be rotatable relative to each other about an axis X. To ensure the relative rotatability, no integral bearing, i.e., no rolling bearing or sliding bearing, is provided in the angular measurement device (bearingless angular measurement device). Instead, first component group 1 is attached to a first machine component, and second component group 2 is attached to a second machine component. The first machine component is arranged so as to be rotatable relative to the second machine component. Component groups 1, 2 lie across from each other and are separated by an air gap.

In the illustrated exemplary embodiment, first component group 1 of the angular measurement device has a shaft 1.1, which has a conical end for the rigid and torsionally fixed attachment to a machine or a motor shaft. Accordingly, shaft 1.1 has a convex mounting area 1.11. An angle scale 1.2 is fixed in place on shaft 1.1 and includes an annular circuit board on which conductive and non-conductive regions, i.e., regions having different electrical conductivities, are provided in a periodic sequence and at identical graduation steps. First component group 1 of the angular measurement device may also be referred to as a rotor.

A scanning unit 2.2, which is allocated to second component group 2, which may also be referred to as a stator in this case, is disposed across from angle scale 1.2 at a scanning distance D. Scanning unit 2.2 is provided in the form of an annular circuit board, which includes excitation coils and sensor coils. Furthermore, scanning unit 2.2 is attached to a housing 2.3. In addition, components of an evaluation electronics 2.21 are provided inside housing 2.3. An ASIC component, for example, is allocated to evaluation electronics 2.21. Integrated into this ASIC component is a circuit for determining the relative angular position between scanning unit 2.2 and angle scale 1.2, as well as a control unit. Moreover, a plug connector 2.22 to which a connection cable to a subsequent electronics is connectable is provided in housing 2.3.

Housing 2.3 is connected to a compensation coupling 2.1 in a torsionally fixed manner. In the illustrated exemplary embodiment, compensation coupling 2.1 includes four components 2.11 as well as a flange 2.12. Components 2.11 are produced from sheet metal and have an angled form in each case, which means that components 2.11 have a first lateral part 2.111 and a second lateral part 2.112. First lateral parts 2.111 extend in a direction with a radial directional component, and second lateral parts 2.112 extend in a direction with an axial directional component in each case, in particular parallel to axis X. In the illustrated exemplary embodiment, first lateral parts 2.111 are attached to housing 2.3 and second lateral parts 2.112 are attached to flange 2.12. Components 2.11 are constructed such that compensation coupling 2.1 is elastically deformable in the direction of axis X. In the illustrated exemplary embodiment, compensation coupling 2.1 is deformed merely elastically, even at an axial travel of, e.g., 1.0 mm, and assumes the original position again when the deflection force is removed.

In addition, compensation coupling 2.1 is torsionally stiff and radially stiff.

Angle scale 1.2 and scanning unit 2.2 are rotatable relative to each other, angle scale 1.2, attached to shaft 1.1, rotating during the operation of the angular measurement device. In this case, the relative rotational speed between scanning unit 2.2 and angle scale 1.2 thus also corresponds to the rotational speed between shaft 1.1 and stationary housing 2.3 or flange 2.12. Because of the non-rotating excitation coils on the scanning unit 2.2 on the stator side, a homogeneous alternating field is generated during the operation of the angular measurement device, which is modulated by angle scale 1.2 as a function of the angular position or of the angle of rotation of shaft 1.1. In the sensor coils, which are likewise situated on scanning unit 2.2, angle-dependent output signals are generated by the modulated electromagnetic field.

In the illustrated exemplary embodiment, the angular measurement device is configured for all-round scanning. In other words, scanning unit 2.2 is particularly configured so that angle scale 1.2 is able to be scanned by scanning unit 2.2 or by the sensor coils virtually across the entire circumference and so that angle-dependent output signals are able to be generated in this manner. In other words, scanning unit 2.2 scans virtually the entire graduation structure of angle scale 1.2 in order to obtain a position signal.

The output signals generated in the process are forwarded to evaluation electronics 2.21 where they are further processed. In the control unit, the output signals are controlled to the effect that they have unchanged signal amplitudes or levels at all times. Toward this end, the signal amplitudes of the output signals are first determined as instantaneous values. Then, the deviation is determined between the previously determined signal amplitudes and a predefined set-point-amplitude value. Depending on the amount of the deviation, a control variable is ascertained with the goal of keeping the deviation within predefined limits. By influencing this control variable, which is the energization of the transmit coils in the illustrated exemplary embodiment, the signal amplitudes are largely kept at a constant level.

For example, the angular measurement device may be used in conjunction with a brake of an electric motor. In this case, compensation coupling 2.1 or flange 2.12 of compensation coupling 2.1 may be mounted on the second machine component. The second machine component may be a brake pad, for instance. Compensation coupling 2.1 is also used for the axial spring-loading or for the generation of an axial contact pressure that permanently forces housing 2.3 against the second machine component, regardless of whether or not the brake has been applied. Shaft 1.1 is permanently connected to the motor shaft. The brake in such systems is normally used as a holding brake and is not engaged when the motor shaft is rotating.

If the brake is applied, housing 2.3 moves in direction $\xi$ (see FIG. 1). First component group 1, on the other hand, remains in an unchanged axial position. This causes a deformation of components 2.11 of compensation coupling 2.1, which are elastic in the axial direction; more specifically, first lateral sides 2.111 move out of the plane of the ring of flange 2.12 in the region of the bending edge. At the same time, scanning distance D becomes smaller.

To begin with, the actual instantaneous value of scanning distance D is determined while the angular measurement device is in operation. For this purpose, the output signals, which are incremental signals in this case and offset in phase by 90°, are conveyed from scanning unit 2.2 to evaluation electronics 2.21. In the control unit, an amount of the control variable required for controlling the signal amplitudes that remain constant is formed. In the illustrated exemplary embodiment, the signal amplitudes are determined in the unit by forming an amplitude mean value from eight consecutive output signals in each case. It is then checked to what extent the signal amplitudes thereby determined deviate from a predefined setpoint-amplitude value. If the amount of the deviation is too large, or if the signal amplitudes lie outside a predefined control window, then the amount of the control variable or the amplification factor will be modified accordingly, so that the levels or the signal amplitudes of the output signals come closer to the setpoint amplitude value.

In addition, the angular position, or position values, of shaft 1.1 is determined in the circuit on the basis of the output signals.

As a matter of principle, it may be determined that the amount of the control variable or the amplification factor or the energization of the transmit coils increases as actual scanning distance D becomes larger.

Scanning distance D consequently includes the information as to whether or not the brake is activated. As a result, it is possible to first ascertain the respective current state of the brake (activated or unengaged) in the above-described manner.

In addition, the wear state of the brake is able to be detected due to the exact determination of scanning distance D. In the illustrated exemplary embodiment, the amount of the control variable or the amplification factor is monitored on a continuous basis. If a slow change occurs in this variable, it may be assumed that this change was not triggered by an activation of the brake but by other influences such as a change in the temperature in the angular measurement device. In the case of a rapid change in the amount of the control variable or the amplification factor, on the other hand, a braking operation may be inferred. In such a case, the change in scanning distance D is measured from the start of the occurrence of a particular gradient of scanning distance D to the end of the corresponding movement. The greater the wear of the brake, the greater the change in scanning distance D due to a braking operation. This allows for a precise determination of the brake wear to, e.g., 0.1 mm so that a statement is possible regarding the remaining service life of the brake.

Such brakes are frequently also constructed such that two brake pads are provided for reasons of a required redundancy, which, situated across from each other, engage on one side of axis X in each case. If uneven wear is present, however, it may happen that the activation of the brake causes tilting of axis X relative to housing 2.3 or relative to scanning unit 2.2. Since scanning unit 2.2 is arranged such that angle scale 1.2 is scannable by scanning unit 2.2 or by the sensor coils virtually across the entire circumference (all-round scanning), the output signals may be exploited for determining the inclination of axis X. Accordingly, in the illustrated exemplary embodiment, the angular measurement device is configured so that the inclination of axis X relative to scanning unit 2.2 is able to be determined on the basis of the output signals. The extent of the inclination, or the angle of inclination, thus provides information about the state or the position of the brake, in particular about the uniformity of the wear of two brake pads.

As a result, it is possible to use the angular measurement device to determine whether or not the brake is engaged. In addition, a defect, e.g., resulting from an excessive degree of the afore-described inclination, may be detected. Moreover, due to the measuring accuracy that is provided in this instance, the wear state of the brake is ascertainable as well. This requires no separate position-measuring device either for determining scanning distance D or for determining the inclination of axis X.

Depending on the respective requirements, either scanning distance D or the inclination of axis X, or both variables, is/are able to be transmitted to the subsequent electronics via an interface which is provided on the angular measurement device, using a serial data transmission, for example. In addition, the angular position and the rotational speed of shaft 1.1 are also forwarded to subsequent electronics for further electronic processing.

What is claimed is:

1. A bearingless angular measurement device, comprising:
    an angle scale;
    a scanning unit;
    a compensation coupling; and
    an evaluation electronics;
    wherein the scanning unit and the angle scale are located at a scanning distance relative to each other and are rotatable relative to each other about an axis;
    wherein the scanning unit is adapted to generate angle-dependent output signals, the evaluation electronics adapted to process the output signals, the angular measurement device adapted to determine the scanning distance based on the output signals;
    wherein the compensation coupling is attachable to a machine component and is elastically deformable in a direction of the axis;
    wherein the machine component includes a brake pad of a brake of an electric motor; and
    wherein an activation state of the brake is ascertainable based on the determined scanning distance and/or a wear state of the brake is determinable based on the determined scanning distance.

2. The bearingless angular measurement device according to claim 1, wherein the compensation coupling is elastically deformable in the direction of the axis by at least 0.5 mm.

3. The bearingless angular measurement device according to claim 1, wherein the compensation coupling includes a plurality of angled components.

4. The bearingless angular measurement device according to claim 3, wherein each component includes a first lateral side extending in a direction with a radial directional component, and a second lateral side extending in a direction with an axial directional component.

5. The bearingless angular measurement device according to claim 1, further comprising a housing, the scanning unit being connected to the housing in a torsionally-fixed manner, the compensation coupling being fixed in place on the housing in a torsionally fixed manner.

6. The bearingless angular measurement device according to claim 1, wherein the compensation coupling is torsionally stiff.

7. The bearingless angular measurement device according to claim 1, wherein the angular measurement device is arranged as an inductive angular measurement device.

8. The bearingless angular measurement device according to claim 1, wherein the scanning unit is adapted to scan the angle scale across at least one half of a circumference of the angle scale to generate angle-dependent output signals.

9. The bearingless angular measurement device according to claim 8, wherein the angular measurement device is adapted to determine an inclination of the axis relative to the scanning unit based on the output signals.

10. The bearingless angular measurement device according to claim 1, wherein the evaluation electronics includes a unit adapted to determine the signal amplitudes of the output signals, the scanning distance being determinable based on the signal amplitudes of the output signals.

11. The bearingless angular measurement device according to claim 1, wherein the angle scale is arranged on a shaft adapted to attach to a machine and/or a motor shaft.

12. The bearingless angular measurement device according to claim 1, wherein the scanning unit includes an annular circuit board.

13. The bearingless angular measurement device according to claim 4, wherein the compensation coupling includes a flange, the second lateral side of each component being attached to the flange.

14. The bearingless angular measurement device according to claim 4, further comprising a housing, the scanning unit being connected to the housing in a torsionally-fixed manner, the compensation coupling being fixed in place on the housing in a torsionally fixed manner, the first lateral side of each component being attached to the housing.

15. The bearingless angular measurement device according to claim 12, wherein the annular circuit board includes excitation coils and sensor coils.

16. The bearingless angular measurement device according to claim 15, wherein the excitation coils are adapted to generate an electromagnetic field, the angle scale is adapted to modulate the electromagnetic field, and the sensor coils area adapted to generate the angle-dependent output signals based on the modulated electromagnetic field.

17. The bearingless angular measurement device according to claim 1, wherein the scanning distance between the scanning unit and the angle scale is changeable based on the elastic deformation of the compensation coupling.

18. The bearingless angular measurement device according to claim 1, wherein the scanning distance between the scanning unit and the angle scale is changeable during a measurement operation of the angular measurement device based on the elastic deformation of the compensation coupling.

* * * * *